April 26, 1960     S. A. BANKS     2,934,096
STEAM HOSE
Filed June 30, 1958

INVENTOR.
SHOLOM A. BANKS
BY
KENWAY, JENNEY, WITTER & HILDRETH
ATTORNEYS

United States Patent Office 2,934,096
Patented Apr. 26, 1960

2,934,096

STEAM HOSE

Sholom A. Banks, Waltham, Mass., assignor to American Biltrite Rubber Co., Inc., Chelsea, Mass., a corporation of Delaware Application June 30, 1958, Serial No. 745,622

5 Claims. (Cl. 138—87)

This invention relates to improvements in steam hose and is particularly directed towards an improved steam hose for use with pile drivers and similar steam driven machinery.

Today, practically all pile driving is accomplished by means of a steam hammer suspended from the boom of a derrick to engage the top of the piling and follow it down as it is driven into the ground. Steam is supplied to the hammer through a flexible pipe or hose that is capable of withstanding high temperatures, high pressures and rough usage.

The hammer used in pile drivers is generally operated by a steam cylinder in which a piston is reciprocated under the control of a system of valves. The various parts move at a relatively high rate of speed and accordingly require a constant feed lubrication system to insure continuous operation.

The need of a dependable lubrication system is based to a large extent on economic factors because most pile driving work is on contract with penalty provisions for unscheduled delays. Should the pile driving operation be shut down because the hammer failed for lack of lubrication, all work would be suspended until repairs could be effected.

In an attempt to achieve dependable operation various means have been developed to provide lubrication to the hammer assembly, but, heretofore, no satisfactory method has been available. Lubricators adjacent the hammer have been used but none have been sufficiently compact or durable enough to stand up under the rigorous conditions imposed by pile driving operations.

To avoid the vibration and pounding on the lubricator it has been found desirable to inject lubricating oil into the line supplying steam to the hammer. This procedure produces reasonably satisfactory lubrication of the various parts, but, while solving one problem, it has created another. Such steam hose is presently composed of reinforced elastomeric material and is capable of long wear when used for steam alone, despite high pressures and temperatures, and rough usage. However, when oil is introduced into the line, the action of the oil combined with the steam softens and depolymerizes the elastomers, shortening the life of the hose to a considerable extent. Since such hose is of a specialized construction, its replacement cost becomes an important item.

The shortened life span of the hose is not the only factor to be considered since rupturing of the hose or breaking away of parts of the carcass wall results in hose sections being carried into the steam cylinder and thus necessitates not only replacement of the hose but also repair of the cylinder, both costly and time consuming operations.

The present invention avoids all the difficulties that have heretofore existed in this field by providing a single hose with multiple parallel passages running longitudinally through the hose structure. Steam is carried through one passage and oil is carried through the other. The oil passage, which is smaller in diameter than the steam passage, is preferably a flexible metallic tube which is unaffected by the action of hot oil, while the steam passage may be constructed with conventional reinforced elastomeric material which is resistant to steam and heat.

The hose is connected to the hammer cylinder with the oil tubes extending somewhat beyond the ends of the hose body for connection with oil fittings at the hammer and at the oil supply line.

The most immediate advantage gained by this invention is the absence of oil in the steam passage, a feature that greatly increases the life span of the hose. Another advantage realized is that the oil is heated to maintain a free flowing lubricant of normally high viscosity by placing the oil tube in parallel and close proximity to the steam passage.

Still another advantage is derived from the circular outer contour of the hose which permits the use of standard couplings and fittings. Moreover, by combining the two tubes in one casing, a much more practical arrangement is achieved and one in which there are no external lines to be tangled.

Therefore, it is an object of this invention to provide a steam hose combined with a lubricating tube in a single hose body or carcass having an outer circular contour.

Another object of this invention is to provide a rugged and long wearing hose for the separate passage of steam and oil in which the oil is heated by pasisng it in close proximity to the steam flowing in the hose.

Yet another object is to provide a multiple passage hose capable of use with conventional fittings.

These and other objects and features of my invention will more readily appear from a detailed description of the invention and by reference to the drawings in which.

Figure 1:
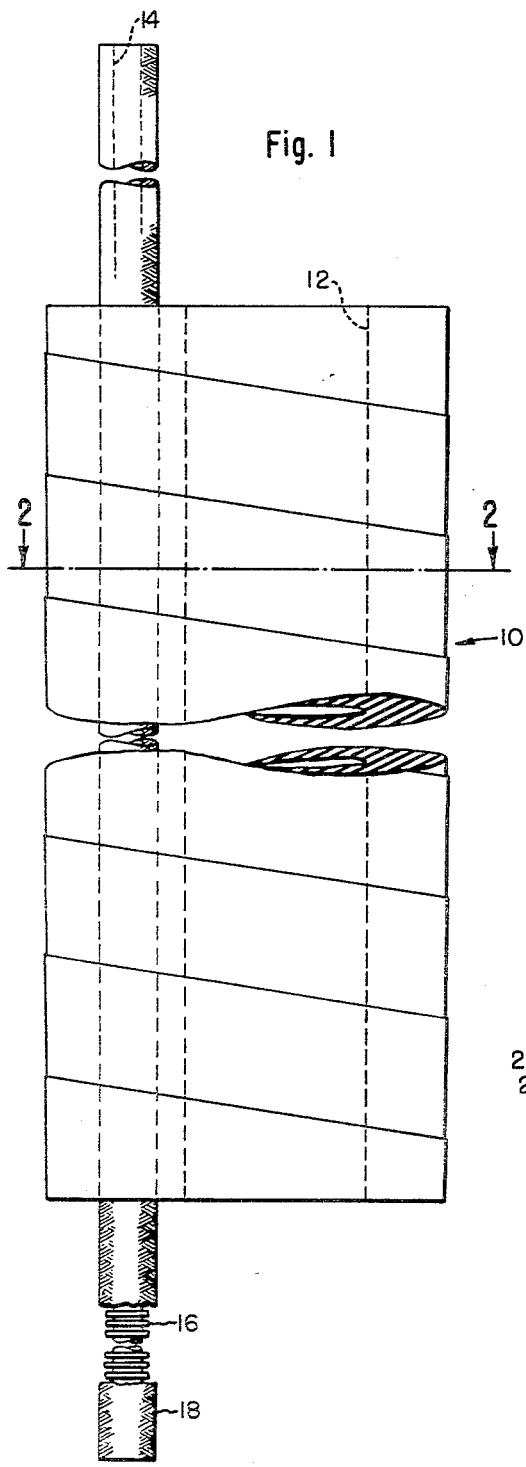
Fig. 1 is a side elevation partly in section showing the carcass and the two passages of the hose.

The following description is of a typical hose made in accordance with my invention and it will be understood that certain variations in size and components may be made without departing from the scope of my invention.

A hose carcass generally indicated by reference character 10 is substantially circular in cross-section and embodies a relatively large steam passage 12 and a smaller oil passage 14.

The oil passage 14 is preferably constructed of a flexible metal bellows tubing 16 sheathed in a tubular layer of wire braiding 18 which serves to armor the tubing 16 and to anchor it firmly to the body of the hose carcass 10. Alternatively the oil tube may be constructed of oil-resistant elastomeric compound. In either case this tubing is leak-proof and is unaffected by the action of hot oil.

The steam passage 12 is preferably constructed with an inner ply of tubing 20 of an elastomeric material that is highly resistant to the action of steam at high temperatures and pressures. Surrounding tube 20 are two tubular plys of braided wire 22, typically two-end .012" wire braid, cement-coated to improve adhesion to adjacent material. Partially encircling the tube 20 and wire braids 22 are one or more suitably shaped filler sections 24 of suitable elastomeric material, which together are generally crescent shaped and at their widest portions define a trough or passage to receive the tubing 16 and its braided cover 18. Encompassing the steam tube, the oil tube and the crescent-shaped filler is a first backing 26 of elastomeric material approximately .025"–.030" thick. Surrounding this is a layer of wire braiding 28 which may have seven ends of .012" wire, and then a second elastomeric ply 30 followed by another ply or wire braiding 32 with ten ends of .012″ wire and a third elastomeric ply 34. A ply of heat-resisting asbestos 36 is braided about the hose and a final cover 38 of elastomeric material is applied to complete the hose.

In manufacturing hoses of this type it is the custom to form the hose about a mandrel and on application of the final cover 38, to wrap the hose spirally with tape, cure the hose and remove the tape and the mandrel. The result is a hose carcass substantially circular in cross-section with parallel passages also circular in cross-section passing longitudinally through the hose carcass. The circular contour of the carcass permits its use with standard fittings while the placement of the oil passage within the steam hose carcass does away with an oil tube separate from the steam hose which would become easily tangled and ruptured. The oil can now be heated by the steam without actual contact, avoiding the disintegrating effects on the hose which result from that combination.

Figure 2:
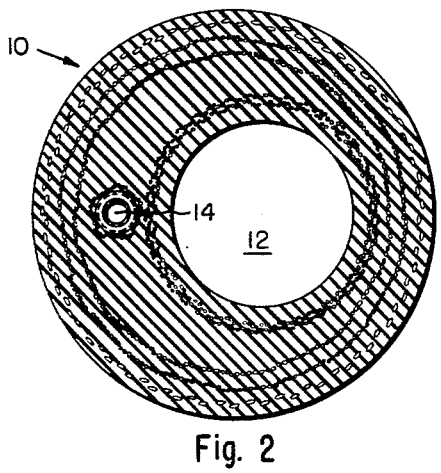
Fig. 2 is a cross-section taken along the line 2—2 of of Fig. 1.
Figure 3:
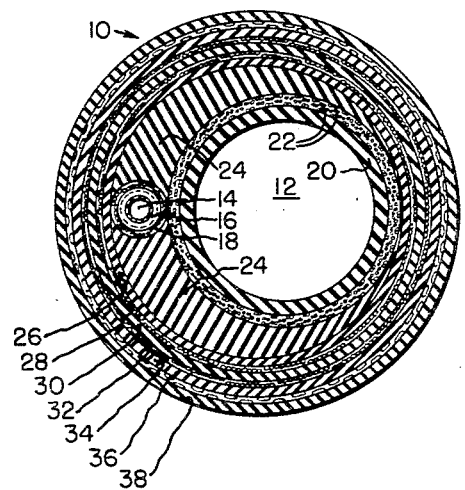
Fig. 3 is a similar view showing the various plys before the hose has been cured.

Curing of the hose vulcanizes and bonds the various layers or plys into firm union with one another and produces a strong, compact, and flexible carcass devoid of air spaces that might exist between the interstices of the braids. Comparison of Figs. 2 and 3 clearly shows the results of the curing process. Fig. 3 shows the hose after all plys have been applied but before curing has taken place. It will be seen that the various plys are clearly defined while Fig. 2, depicting the same hose after curing, shows that the various plys have become substantially bonded.

In practice the oil tube 16 and its outer braiding 18, extend beyond the ends of the hose carcass to permit connection of the tubes to the proper lubrication fittings, leaving very little of the oil tube exposed to injury.

Having this disclosed my invention and described in detail an illustrative embodiment thereof, I claim as new and desire to secure by Letters Patent:

1. A multiple passage flexible hose including a reinforced elastomeric tube defining a relatively large steam passage, a flexible metallic tube defining a relatively small oil passage disposed parallel to said steam passage, filler sections disposed longitudinally adjacent portions of said elastomeric tube and said metallic tube, reinforced elastomeric material and insulation backing wound about both of said tubes and said filler sections and defining a single hose carcass substantially circular in peripheral contour.

2. A flexible hose comprising an outer carcass substantially circular in cross-section, a relatively large steam passage eccentrically and longitudinally disposed within said carcass for the flow of steam and a smaller oil passage eccentrically and longitudinally disposed within said carcass for the flow of oil in parallel proximity to said first passage, the oil passage containing flexible metal tubing sheathed in a layer of wire braiding which serves to armour the tubing and to anchor it firmly in the carcass of the hose.

3. A flexible hose comprising a reinforced elastomeric tube for the flow of steam, filler segments generally crescent-shaped in cross-section longitudinally encompassing a portion of said elastomeric tube, a passage formed longitudinally by said filler segments at their thickest portion to receive a flexible metal tube for the flow of oil, and multiple layers of reinforced elastomeric material wrapped about both of said tubes and said filler segments.

4. A flexible steam hose including in its structure an integral elastomeric body containing a relatively large tubular passage for steam and a separate smaller passage for oil having oil-resistant walls and extending parallel and in close proximity to said steam passage whereby oil flowing therein is heated by steam flowing in the steam passage, the walls of the oil passage comprising an oil resistant tube engaged on both sides by crescent-shaped fillers enclosed within the body of the hose.

5. A flexible steam hose as defined in claim 4 in which the large tubular steam passage is encased in a tube of braided wire and the smaller oil passage is encased in a separate tube of braided wire.

References Cited in the file of this patent
UNITED STATES PATENTS

| | | |
|---|---|---|
| 1,718,978 | Protzeller | July 2, 1929 |
| 2,045,671 | Ogee | June 30, 1936 |
| 2,260,537 | Nelson | Oct. 28, 1941 |
| 2,778,609 | Peeps | Jan. 22, 1957 |